Aug. 11, 1942.   R. W. FOUSHEE   2,292,627
TRACTOR HITCH
Filed Dec. 21, 1939

INVENTOR:
Robert W. Foushee
BY Kent W. Nonnell
ATTORNEY.

Patented Aug. 11, 1942

2,292,627

UNITED STATES PATENT OFFICE 2,292,627

TRACTOR HITCH

Robert W. Foushee, Princeton, Ill.

Application December 21, 1939, Serial No. 310,297

7 Claims. (Cl. 280—33.10)

This invention relates in general to a draw bar connector for a tractor and may be included as a regular part of the tractor equipment or applied thereto as an adjunct or attachment.

An important object of the invention is in the provision of means for improving and varying the draft of the tractor, and more particularly in varying the path of the plows or other implements or vehicles drawn by the tractor when it is turned in a path at an angle and more particularly at right angles to the path along which it has been proceeding.

A further object of the invention is in the provision of a movable tractor hitch by means of which a plow or another implement or vehicle drawn by a tractor may be separately and independently moved out of the direct path of the tractor, particularly in turning a corner.

A still further object of the invention is in the provision of tractor hitch mechanism by means of which a plow or other farm implement drawn by a tractor may be moved relatively thereto for plowing a sharper turn at a corner without leaving unplowed spaces between the furrows.

A still further object of the invention is in the provision of a draw bar attachment for tractors operative to move a plow or other implement ordinarily drawn by a tractor independently of the movement thereof and at an angle to the direction of movement of the tractor.

Other and further objects of the invention will appear hereinafter, the novel construction arrangement being shown in the accompanying drawing, in which—

Figure 1:
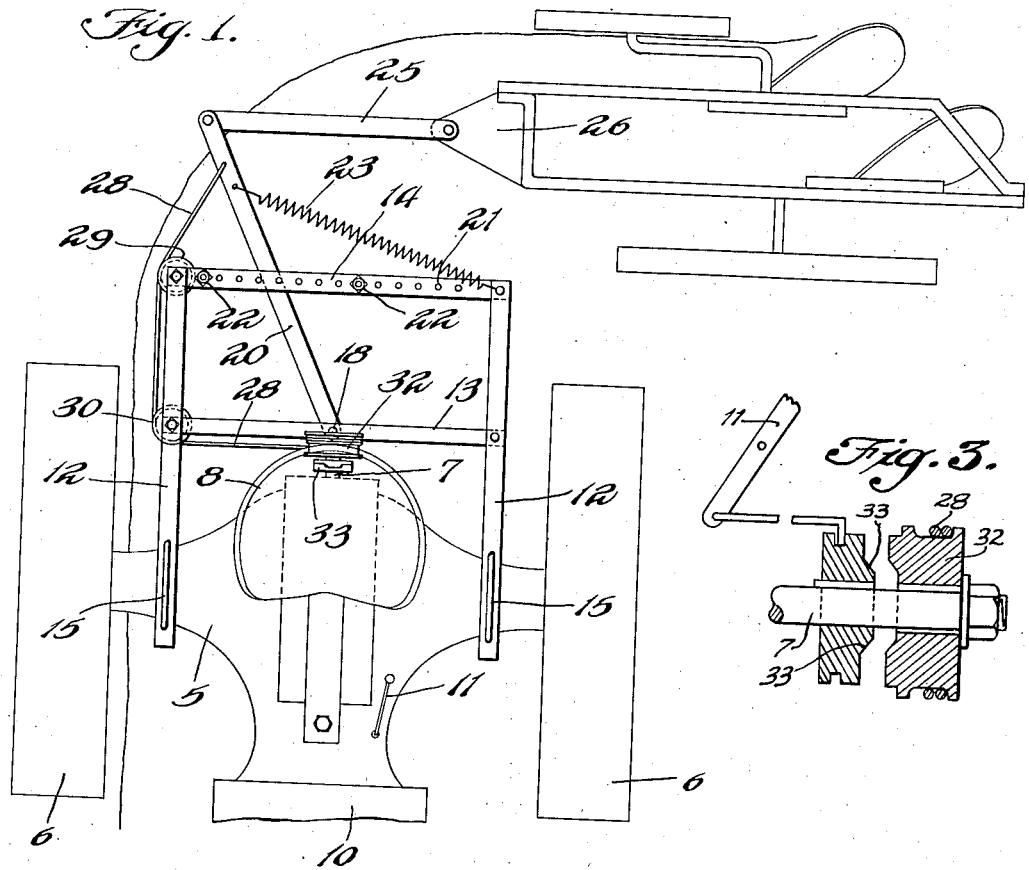
Fig. 1 is a plan view illustrating the construction and operation of the invention.
Figure 3:
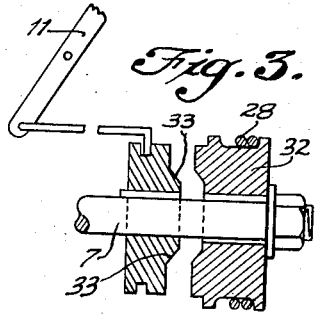
Fig. 3 is a sectional detail of the power take-off drive.
Figure 2:
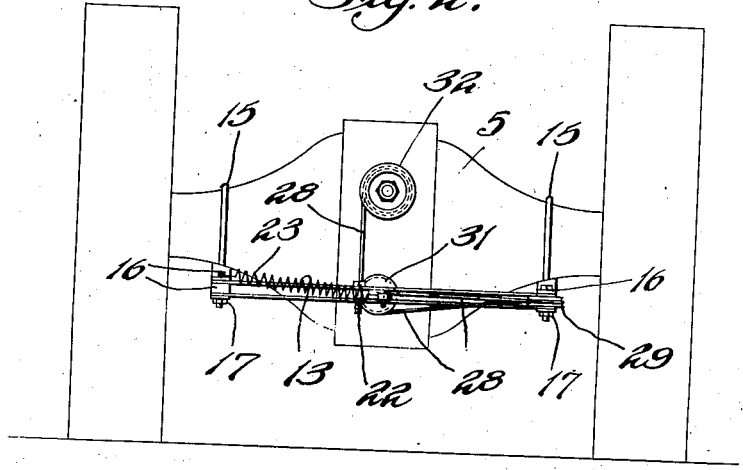
Fig. 2 is a rear elevation of the attachment as applied to a tractor.

It is frequently desirable to vary the path of a plow or other implement drawn by a tractor particularly in avoiding an obstruction, or in making a turn at an angle or corner. It is also desirable to have plows or other implements at turns or corners to enable the tractor and a plow or gang of plows to make a sharp turn without leaving unplowed spaces between the furrows, particularly at the turn.

If a tractor is turned too sharply with respect to a plow in a heavy soil it may tend to tip or overturn the tractor in turning a corner, but the present invention is designed and intended to provide an independent draw bar operator actuated from a power takeoff connection which is common to most tractors.

Referring now more particularly to the drawing a tractor of conventional form is represented as having a rear gear case and axle housing 5 with rear drive wheels 6 operated by an engine 10 at the front of the tractor. At the rear of the housing of most tractors is a power takeoff shaft 7 either exposed or accessible through an opening covered by a removable plate. This shaft is usually located at the rear of and below the driver's seat 8 and is connected directly or through a speed reducing transmission with the engine. Ordinarily it is not operated but may be optionally connected by a pull rod or shift lever 11 disposed adjacent to and easily accessible from the seat 8.

Attached to the tractor housing and extending rearwardly therefrom is an open metal frame comprising side bars 12 and cross bars 13 connecting them and a perforated end bar 14. This frame may be built as a part of the vehicle or it may be connected thereto as an attachment in any suitable manner as, for example, by means of U-bolts 15 adapted to extend over the axle portions of the housing with their extremities through one end of each side bar 12 where they are positioned and held in place by washers 16 and fastening nuts 17.

Attached preferably midway of the cross bar 13 by means of a pivot 18 is a draw bar 20 which extends beyond and overlies the perforated end bar 14. Adjustable or variable in perforations 21 of the end bar is a headed stop bolt 22 adapted to be engaged by the draw bar 20 in one direction of movement thereof and normally to be held against the bolt by a spring 23 connected at one end to the draw bar and at the other end to a point at one side of the frame.

The outer end of the draw bar is ordinarily connected by means of a link 25 with the gang plow 26, a harrow, disc or other equipment, and in ordinary operation the implement or vehicle is drawn directly behind the tractor depending upon the path thereof.

In order to move the draw bar 12 to swing about its pivot 18 independent of the movement of the tractor a rope or cable 28 is attached to the outer end of the draw bar and it extends around pulleys 29 and 30 at one side of the frame and preferably around the pulley 31 attached to the cross bar 13 and is then connected to a winding drum 32. The winding drum is connected to the power takeoff shaft 7 preferably through a slip clutch 33, the arrangements being such that when the hand lever 11 is actuated by the operator of the tractor, the power takeoff shaft and the drum will be rotated in a direction to pull the draw bar 20 against the tension of spring 23 to one side of the normal or central position. If the draw bar engages the outermost pulley 29 or if any other obstruction should be encountered either by the gang plow or any other vehicle drawn by the tractor which would tend to upset the tractor or to damage any of the equipment or if the operator failed to release the actuated lever 11 at the proper time then the operation of the slip clutch 33 prevents any damage to the parts or breakage of the cable 28.

This construction and arrangement is particularly adapted and valuable in improving the plowing or making a short angular turn with a tractor and an implement or vehicle attached thereto. For example, if the tractor has been proceeding along the path parallel with the longitudinal axis of the plow 26 in Fig. 1, and it is desirable to make a right angle turn, the tractor is turned sharply at the corner, and at an angle or at right angles to the previous path. The tractor may be stopped at this right angled position or if the operator is adept or experienced the motion of the tractor may be continued but the power takeoff is operated to pull the draw bar to one side of its ordinary position thereby drawing the gang plow 26 or other implement independently forward in its path and into the new path of the tractor where the path of the plows may be rounded sharply and turned into the new path of the tractor by the combined propelling movement of the tractor and the applied takeoff movement of the draw bar.

After the plow has been pulled up by the draw bar more nearly into the new path of the tractor the power takeoff connection is released and the spring 23 gradually restores the draw bar to its central or normal position as the tractor proceeds along the new path, the spring also unwinding the cable 28 from the drum 32 since the power takeoff connection has been released.

While operation of this construction is described in connection with a plow it may also be used to advantage with any other vehicle or implement drawn by a tractor to vary the path of the implement during a straight pull of the tractor or to facilitate the turning thereof in making a sharp turn at a corner. In plowing this will permit corners of a field to be plowed more easily and more fully with a square turn and without leaving unplowed spaces between the furrows. It makes it unnecessary for additional head room or turning at the corners of a field and prevents packing down the soil in making a loop for turning at the corners of a field. By providing the proper openings in the frame the pulleys, stop bolts and spring 23 may be quickly and easily adjusted for right or left movement of the draw bar, depending upon the desired operation thereof. If applied as an attachment the frame may be easily applied or removed by simply disconnecting the U-bolts 15 and the driving connections.

I claim:

1. The combination of a tractor having a power take off shaft and means for actuating it, of a draw bar pivoted at one end, means connecting the power takeoff shaft and the free end of the draw bar for pulling it laterally in one direction and a spring for pulling the free end of the draw bar laterally in the opposite direction and a variable stop to engage the draw bar for limiting the movement thereof in the direction impelled by the spring.

2. The combination of a tractor having a rotatable power take-off shaft at its rear and tractor power means for actuating the shaft independently of the movement of the tractor, a draw bar pivoted at one end to the tractor, a winding drum attached for releasable engagement with the power take off shaft, a flexible connection extending from the winding drum to the outer end of the draw bar for positively pulling it laterally in one direction and spring means for pulling the draw bar laterally in the other direction unwinding the flexible connection from the drum when disengaged from said shaft.

3. In a tractor hitch, the combination of a power take off drive shaft and means for actuating it at will, and a winding drum for connection to the shaft, a draw bar pivoted at one end to the tractor, a flexible connection extending around the drum and to the outer end of the draw bar for pulling it laterally in one direction and a slip clutch connection between the drum and the shaft for preventing breakage or damage to the tractor, the draw bar or flexible connection.

4. In a tractor hitch, a housing, a rotatable power take off shaft at the rear of the housing and means for operating it by the power of the tractor, a winding drum attached to the shaft, a draw bar pivotally connected to the tractor, a frame comprising side bars connected at the ends to the tractor housing and having a perforated cross bar extending below the draw bar intermediate the ends thereof for supporting the draw bar, a flexible cable connecting the outer end of the draw bar and the winding drum, and pulleys supported by the frame and adjustably located on the cross bar to direct the flexible cable for pulling the draw bar laterally to one side of the frame.

5. A tractor hitch attachment for tractors having a selectively operable power take off shaft, comprising a frame having side bars attachable at one end to the housing of the tractor, a cross bar intermediate the ends the side bars and a perforated end bar, a winding drum adapted to be attached to a tractor power takeoff shaft, pulleys attachable at one side of the frame, a draw bar pivoted to one end of the cross bar and overlapping the perforated end bar of the frame and a flexible cable extending around the winding drum and around to the pulleys at one side of the frame and attachable to the outer end of the draw bar for pulling the draw bar laterally in the frame.

6. A structure in accordance with claim 5 in which a stop bolt may be adjustably set in any one of the perforations in the end bar for limiting the movement of the draw bar in one direction, together with a spring attached at one end to the outer end of the draw bar and at the other end to the frame at the side opposite the pulleys for pulling the draw bar against the stop pin.

7. The combination with a tractor having a rotatable power take-off shaft and means for operating it by power from the tractor at will, of a plow or other vehicle adapted to be drawn by a tractor, a draw bar pivoted at one end to the tractor and connected at the other end to the said plow or other implement, directional pulleys adjustable in a frame at the rear of the tractor, and cable means in connection with the power take-off shaft and the free end of the draw bar and engaging the pulleys for pulling the draw bar laterally by the power of the tractor to change the path or direction of movement of the plow or other implement independently of the path or direction of movement of the tractor itself.

ROBERT W. FOUSHEE.